US012707351B2

(12) United States Patent
Tripathi

(10) Patent No.: US 12,707,351 B2
(45) Date of Patent: Aug. 11, 2026

(54) SYSTEM, METHOD, AND COMPUTER PROGRAM FOR SMART ANR MANAGEMENT FOR NSA DEVICES

(71) Applicant: RAKUTEN MOBILE, INC., Tokyo (JP)

(72) Inventor: Sandeep Mani Tripathi, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 542 days.

(21) Appl. No.: 18/014,050

(22) PCT Filed: Oct. 27, 2022

(86) PCT No.: PCT/US2022/047996
§ 371 (c)(1),
(2) Date: Dec. 30, 2022

(87) PCT Pub. No.: WO2024/091236
PCT Pub. Date: May 2, 2024

(65) Prior Publication Data

US 2024/0259898 A1 Aug. 1, 2024

(51) Int. Cl.
*H04W 36/00* (2009.01)

(52) U.S. Cl.
CPC .............. *H04W 36/008357* (2023.05); *H04W 36/0061* (2013.01); *H04W 36/0069* (2018.08)

(58) Field of Classification Search
CPC ......... H04W 28/0226; H04W 28/0865; H04W 28/09; H04W 36/0061; H04W 36/0069; H04W 36/00698; H04W 36/008357; H04W 76/15
See application file for complete search history.

(56) References Cited

U.S. PATENT DOCUMENTS 8,855,644 B2 * 10/2014 Maida ............. H04W 36/00835 455/436
10,939,365 B1 * 3/2021 Sung ..................... H04W 24/08
11,290,928 B1 * 3/2022 Vivanco .......... H04W 36/00835
11,895,719 B1 * 2/2024 Polaganga ............ H04W 24/02
(Continued)

OTHER PUBLICATIONS

"Universal Mobile Telecommunications System (UMTS); LTE; 5G; NR; Multi-connectivity; Overall description; Stage-2" ETSI TS 137340 V15.5.0 (3GPP TS 37.340 version 15.5.0 Release 15). May 2019. (Year: 2019).*
(Continued)

*Primary Examiner* — Stephen J Clawson
(74) *Attorney, Agent, or Firm* — Sughrue Mion, PLLC

(57) ABSTRACT

Systems, apparatuses, methods, and computer programs that communicate with a User Equipment (UE) device that is simultaneously using a first wireless communication protocol and a second wireless communication protocol; determine the UE device is proximate to a neighbor cell; determine the neighbor cell is absent from a neighbor relations table; cause the UE device to cease simultaneously using the first wireless communication protocol and the second wireless communication protocol; cause the UE device to only use the first wireless communication protocol; receive information while the UE device is only using the first wireless communication protocol; and use the information to add the neighbor cell to the neighbor relations table.

20 Claims, 7 Drawing Sheets

(56) References Cited

U.S. PATENT DOCUMENTS

2010/0291939 A1* 11/2010 Jen ........................ H04W 76/19 455/450
2011/0070897 A1* 3/2011 Tang ..................... H04W 24/02 455/466
2015/0271714 A1* 9/2015 Shetigar ............ H04W 36/0061 370/255
2016/0150453 A1* 5/2016 Narayanan ........ H04W 36/0061 455/436
2019/0268833 A1* 8/2019 Kwok ................... H04W 48/16
2019/0306728 A1* 10/2019 Lei .................. H04W 36/00698
2019/0350018 A1* 11/2019 Moosavi ............... H04W 76/11
2019/0357095 A1* 11/2019 Pakniat ............. H04W 36/0094
2020/0396785 A1* 12/2020 Cao ....................... H04W 76/15
2021/0014916 A1* 1/2021 Raval .................... H04W 92/02
2021/0160744 A1* 5/2021 Zetterberg ............ H04W 24/02
2021/0211899 A1* 7/2021 Koziol .................. H04W 24/10
2021/0211949 A1* 7/2021 Pakniat ............. H04W 36/0061
2021/0211952 A1* 7/2021 Teyeb ................. H04W 36/305
2021/0250822 A1* 8/2021 Mishra .................. H04W 4/029
2021/0266762 A1* 8/2021 Stawiarski .............. H04W 8/04
2021/0266802 A1* 8/2021 Arshad ............. H04W 36/0066
2021/0329723 A1* 10/2021 Teyeb ............. H04W 36/00698
2022/0167298 A1 5/2022 Kang et al.
2023/0039510 A1* 2/2023 Medithe ................ H04W 24/10
2023/0097617 A1* 3/2023 Pradhan ........ H04W 36/008355 370/329
2024/0205762 A1* 6/2024 Bhattacharjee ....... H04W 76/15

OTHER PUBLICATIONS

R2-1806154—Ericsson "CR on inter-RAT ANR to 36.300 for EN-DC" 3GPP TSG-RAN WG2 Meeting #101bis; Sanya P.R. of China, Apr. 16-20, 2018 (Year: 2018).*

3GPP TS 38.300 v16.0.0 "3rd Generation Partnership Project; Technical Specification Group Radio Access Network; NR; NR and NG-RAN Overall Description; Stage 2 (Release 16)" Dec. 2019. (Year: 2019).*

International Search Report dated Mar. 21, 2023 in Application No. PCT/US22/47996.

Written Opinion of the International Searching Authority dated Mar. 21, 2023 in Application No. PCT/US22/47996.

* cited by examiner

600
Cloud Computing Environment
622
Computing Resource
624
Computing Resource
624
Computing Resource
624
Computing Resource
624
Platform
620
VMs
624-2
HYPs
624-4
APPs
624-1
VSs
624-3
Network
630
User Device
610

SYSTEM, METHOD, AND COMPUTER PROGRAM FOR SMART ANR MANAGEMENT FOR NSA DEVICES

CROSS REFERENCE TO RELATED APPLICATIONS

This application is a National Stage of International Application No. PCT/US2022/047996 filed Oct. 27, 2022.

1. FIELD

Systems, apparatuses, methods, and computer programs consistent with example embodiments of the present disclosure relate to Automatic Neighbor Relation (ANR) systems.

2. DESCRIPTION OF RELATED ART

In recent decades, the mobile device industry has sequentially developed new iterations or "generations" of wireless technologies. While mobile devices that support newer generation technologies generally have increased processing speeds, data transfer rates, etc., user adoption of mobile devices that support the newer generation technology is gradual. As such, a transition from an older generation wireless technology to a newer generation wireless technology may take many years, and mobile device service providers have experienced problems with their networks that support a multitude of wireless technologies.

Specific problems have been experienced with the development of "dual connectivity" mobile devices, which are mobile devices capable of simultaneously using two different wireless communication technologies. For example, when a dual connectivity (DC) mobile device moves away from one base station (a source cell) toward another base station (a target cell), the "handover" process of transferring the mobile device's connection from the source cell to the target cell will fail if the source cell and the target cell do not already have a "neighbor relation." In this case, the connection between the dual connectivity mobile device and the source cell deteriorates as the mobile device travels farther from the source cell. Ultimately, the connection between the dual connectivity mobile device and the source cell will completely fail if the mobile device travels far enough from the source cell. Additionally, existing dual connectivity mobile devices may be incapable of facilitating the creation of a neighbor relation between two adjacent cells that lack a neighbor relation.

Accordingly, related art systems have failed to adequately support dual connectivity mobile devices moving between base stations that lack neighbor relations. It is thus desired to address the above-mentioned disadvantages and shortcomings of the existing systems and methods and provide an improved ANR system that uses dual connectivity mobile devices to facilitate the creation of neighbor relations between base stations that lack neighbor relations thereby maintaining strong connections to the dual connectivity mobile devices even when the dual connectivity mobile devices move between base stations that lack neighbor relations.

SUMMARY

Accordingly, systems and methods for adding a neighbor cell to a neighbor relations table are provided. In some embodiments, a method may include communicating with a User Equipment (UE) device that is simultaneously using a first wireless communication protocol and a second wireless communication protocol; determining the UE device is proximate to the neighbor cell; determining the neighbor cell is absent from the neighbor relations table; causing the UE device to cease simultaneously using the first wireless communication protocol and the second wireless communication protocol; causing the UE device to only use the first wireless communication protocol; receiving information while the UE device is only using the first wireless communication protocol; and using the information to add the neighbor cell to the neighbor relations table.

The method may further include causing the UE device to simultaneously use the first wireless communication protocol and the second wireless communication protocol after the neighbor cell is added to the neighbor relations table.

The method may further include determining the UE device is incapable of decoding or reporting a network-entity-related identifier.

In some embodiments, determining the UE device is incapable of decoding or reporting the network-entity-related identifier includes determining the UE device is incapable of decoding or reporting an E-UTRAN Cell Global Identifier (ECGI).

Also, determining the UE device is incapable of decoding or reporting the network-entity-related identifier may include determining the UE device has transmitted a plurality of communications including a same Physical Cell Identifier (PCI) of the neighbor cell.

Additionally, the communicating with the UE device that is simultaneously using the first wireless communication protocol and the second wireless communication protocol may include communicating using Eutra New Radio Dual Connectivity (ENDC).

Further, determining the neighbor cell is absent from a neighbor relations table may include receiving a Physical Cell Identifier (PCI) of the neighbor cell and determining the PCI of the neighbor cell is absent from a database storing PCIs associated with neighbor cells previously added to the neighbor relations table.

Further still, causing the UE device to only use the first wireless communication protocol may include causing the UE device to only use an LTE communication protocol.

In another embodiment, a method may include communicating with a User Equipment (UE) device that is using a first wireless communication protocol; determining the UE device is proximate to a neighbor cell; determining the neighbor cell is absent from a neighbor relations table; causing the UE device to stop using the first wireless communication protocol and start using a second wireless communication protocol; receiving information while the UE device is only using the second wireless communication protocol; and using the information to add the neighbor cell to the neighbor relations table.

The method may further include causing the UE device to stop using the second communication protocol and begin using the first wireless communication protocol after the neighbor cell is added to the neighbor relations table.

The method may further include determining the UE device is incapable of decoding or reporting a network-entity-related identifier.

In some embodiments, determining the UE device is incapable of decoding or reporting the network-entity-related identifier may include determining the UE device is incapable of decoding or reporting an E-UTRAN Cell Global Identifier (ECGI).

Also, determining the UE device is incapable of decoding or reporting the network-entity-related identifier may include determining the UE device has transmitted a plurality of communications including a same Physical Cell Identifier (PCI) of the neighbor cell.

Additionally, communicating with the UE device that is using the first wireless communication protocol may include communicating with a 5G UE device.

Further, determining the neighbor cell is absent from a neighbor relations table may include receiving a Physical Cell Identifier (PCI) of the neighbor cell and determining the PCI of the neighbor cell is absent from a database storing PCIs associated with neighbor cells previously added to the neighbor relations table.

Further still, causing the UE device to only use the first wireless communication protocol may include causing the UE device to only use an LTE communication protocol.

In yet another embodiment, a non-transitory computer-readable medium may store computer readable program code or instructions for carrying out operations, which when executed by a processor may add a neighbor cell to a neighbor relations table. The operations may include communicating with a User Equipment (UE) device that is simultaneously using a first wireless communication protocol and a second wireless communication protocol; determining the UE device is proximate to a neighbor cell; determining the neighbor cell is absent from a neighbor relations table; causing the UE device to cease simultaneously using the first wireless communication protocol and the second wireless communication protocol; causing the UE device to only use the second wireless communication protocol; receiving information while the UE device is only using the second wireless communication protocol; and using the information to add the neighbor cell to the neighbor relations table.

The operations may further include causing the UE device to simultaneously use the first wireless communication protocol and the second wireless communication protocol after the neighbor cell is added to the neighbor relations table.

The operations may further include determining the UE device is incapable of decoding or reporting a network-entity-related identifier.

Also, the operation of determining the UE device is incapable of decoding or reporting the network-entity-related identifier may include determining the UE device is incapable of decoding or reporting an E-UTRAN Cell Global Identifier (ECGI).

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein, and the embodiments herein include all such modifications.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION

Figure 1:
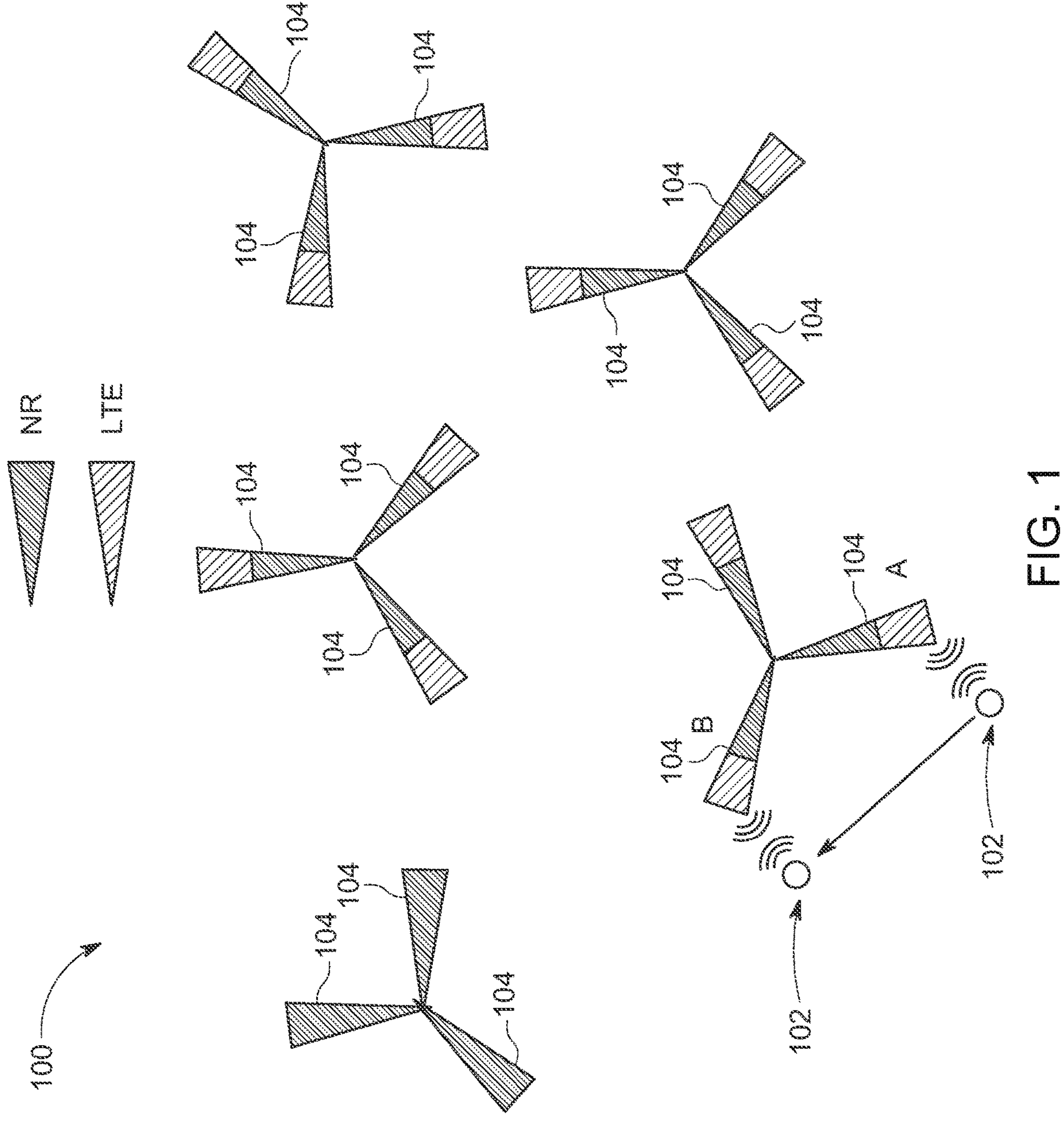
FIG. 1 illustrates a system of base station cells and a User Equipment (UE) device, which moves from being in proximity to a first cell to being in proximity to a second cell, in accordance with one or more example embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide systems and methods for using dual connectivity mobile devices to facilitate the creation of neighbor relations between base stations that lack neighbor relations thereby maintaining strong connections to the dual connectivity mobile devices even when the dual connectivity mobile devices move between base stations that lack neighbor relations.

FIG. 1 shows a system 100 of that depicts a mobile device 102 that travels within a network of mobile device base stations 104 used to connect the mobile device 102 to a mobile network. Each base station 104 may be referred to as a cell station 104 or simply a "cell" 104, and the mobile device 102 may be referred to as a User Equipment (UE) device 102, or simply a UE 102. Each cell 104 may be configured to operate using one or more communication protocols. For example, a cell 104 may be configured to operate using only "New Radio" (NR), which is also known as fifth generation wireless communication technology, or "5G." Alternatively, a cell 104 may be configured to operate using both NR and Long Term Evolution or "LTE" wireless communication technology. While NR and LTE are provided as exemplary wireless communication technologies, any wireless communication protocol, standard, or technology may be used, and a cell 104 may be configured to operate using one, two, or any number of wireless communication protocols, standards, or technologies, alone or in combination.

FIG. 1 specifically shows UE 102 beginning in a first location proximate to a first cell 104, which is labeled cell A. The UE 102 then moves from the first location to a second location proximate to a second cell 104, which is labeled cell B. In FIG. 1, both cell A and cell B may be configured to operate using NR alone, LTE alone, or NR and LTE simultaneously.

When the UE 102 begins at the first location, the UE 102 is communicating with cell A. When UE 102 moves sufficiently close to cell B, the UE 102 may begin wirelessly communicating with cell B, and at this point, the UE 102 is in communication with both of cells A and B. If and when a handover process is completed, the UE 102 may only communicate with cell B. When a UE 102 is moving from the proximity of a first cell 102, e.g., cell A, toward the proximity of a second cell, e.g., cell B, the first cell may be referred to as the "source cell," and the second cell may be referred to as the "target cell," especially if the UE 102 makes a determination that signal measurements of communications with the second cell are stronger than or of higher quality than the signal measurements of communications with the first cell.

In some embodiments, the user device 102 may obtain information from cell B such as either or both of (1) a Physical Cell Identifier (PCI), which is an identifier of a cell in the physical layer of the LTE network, and (2) an Absolute Radio Frequency Channel Number (ARFCN), which may be a code specifying a pair of physical radio carriers (one for the uplink signal and one for the downlink signal) used for transmission and reception in a land mobile radio system. In some embodiments, the user device 102 may obtain alternate or additional information relating to the cell. Notably, every cell in an LTE network may not have a unique PCI. In the LTE architecture, there are a limited number of PCI values. When the number of cells in the LTE network exceed the limited number of PCI values, for example, different cells may have the same PCI value.

When the UE 102 communicates with cell B, the UE 102 may measure characteristics of their wireless transmissions. For example, the UE 102 may measure one or more of a Received Signal Strength Indicator (RSSI), a Reference Signal Received Power (RSRP), a Reference Signal Received Quality (RSRQ), or a Signal to Noise Ratio (SINR). As the UE 102 moves further from cell A and closer to cell B, it may be advantageous to perform a "handover" process in which cellular transmission (voice or data) is transferred from cell A to cell B without losing connectivity to the cellular transmission.

The UE 102 may operate in a radio access network (RAN), and the RAN may include a plurality of nodes. In general, a node corresponding to an LTE cell may be referred to as an "Evolved Node B," "eNode B," or simply "eNB"; and a node corresponding to a 5G cell may be referred to a "Next Generation Node B," "gNode B," or simply "gNB." A dual connectivity UE 102 may be simultaneously connected to two nodes, e.g., a master node and a secondary node; or a dual connectivity UE 102 may be simultaneously connected to two cell groups, e.g., a master cell group (mCG) and a secondary cell group (sCG). One exemplary dual connectivity standard is the Evolved-Universal Terrestrial Radio Access Network (E-UTRAN) New Radio-Dual Connectivity or "EN-DC." EN-DC is a non-standalone (NSA) architecture that enables a UE 102 to access both 5G (NR) and 4G LTE networks at the same time. A UE 102 operating in EN-DC may be referred to as an "NSA UE." While EN-DC is one exemplary dual connectivity architecture, any dual connectivity architecture or protocol may be used such as, e.g., NGEN-DC, NE-DC, NR-DC, or any other dual connectivity architecture or protocol now known or later developed. A device operating in 5G DC (Dual Connectivity), identifies the secondary RAN node as the "Secondary gNB" or "SgNB"; and in EN-DC, this secondary RAN node may be referred to as the "en-gNB." When there is a handover in EN-DC, the eNB, which pertains to LTE, is the master cell (MeNB), and the gNB is the secondary cell (SgNB). With an EN-DC handover, a source eNB is handed over to the target gNB.

In order to perform a handover, two adjacent cells may be required to have a "neighbor relation." Each cell or node (e.g., an eNB) may have a Neighbor Relations Table (NRT). If information relating to a neighbor cell is included in a cell's NRT, the cell is said to have a "neighbor relation" with the neighbor cell.

If a UE 102 is only configured to communicate using LTE, moving between cells that do not have a neighbor relation is not problematic because LTE-only UEs are generally configured with "ECGI reporting" or "ECGI decoding," which may relate to the ability to obtain a neighbor cell's the E-UTRAN Cell Global Identifier (ECGI), which may be used to create a neighbor relation. While future devices may be equipped with ECGI reporting or ECGI decoding, UEs in existence today are incapable of such functionality, and this lack of functionality may be due to hardware limitations of the existing UEs themselves. In some embodiments, a UE may perform ECGI reporting or decoding when the UE is in either an idle mode or a compress mode.

With reference to FIG. 1, in a case in which the UE 102 is an LTE-only UE 102, such an LTE-only UE 102 may use the following process to determine whether cells A and B have a neighbor relation, and if needed, establish a neighbor relation between them. When the LTE-only UE 102 moves within proximity of cell B, the LTE-only UE 102 may obtain the PCI, the ARFCN, and one or more measurements (RSSI, RSRP, RSRQ, SINR, etc.) of the communications between the NSA UE 102 and cell B. The LTE-only UE 102 may also obtain one or more measurements (RSSI, RSRP, RSRQ, SINR, etc.) of its communications with cell A, which it may use to compare to the cell B measurements.

The LTE-only UE 102 may report the PCI, ARFCN, and cell B measurements to cell A. Then, cell A may determine whether the PCI of cell B is in its NRT. If cell A determines the PCI of cell B is not its NRT, cell A determines it does not have a neighbor relation with cell B. If cell A determines it does not have a neighbor relation with cell B, cell A will request the LTE-only UE 102 obtain and report the ECGI of cell B. The LTE-only UE 102 may then decode a message from cell B (eNB) known as a System Information Block (SIB) to obtain the ECGI of cell B. The LTE-only UE 102 may then transmit the ECGI of cell B to cell A. Cell A may then add the PCI and ECGI of cell B to its NRT thereby establishing a neighbor relation between itself and cell B.

Because PCI values are not unique to cells, even if cell A determines the PCI of cell B is in its NRT, there may be a chance that cell B still does not have a neighbor relation with cell A. Therefore, even if cell A determines the PCI of cell B is in its NRT, cell A will request the LTE-only UE 102 obtain and report the ECGI of cell B. The LTE-only UE 102 may then decode the SIB of cell B and obtain the ECGI of cell B. The LTE-only UE 102 may then transmit the ECGI of cell B to cell A. Cell A may make a determination of whether the ECGI of cell B is in its NRT. If cell A determines the ECGI of cell B is in its NRT, cell A makes a determination that it has a neighbor relation with cell B. Upon making a determination that cell A has a neighbor relation with cell B. If cell A determines the ECGI of cell B is not in its NRT, cell A makes a determination that it does not have a neighbor relation with cell B and adds the PCI and ECGI of cell B to its NRT thereby establishing the missing neighbor relation.

If (1) cell A determines it has a neighbor relation with cell B, and (2) the measurements between cell B and the UE 102, when compared to the measurements between cell A and the UE 102, indicate that the UE 102 would have a stronger connection with cell B, a handover process may be initiated to transfer the cellular transmission from cell A to cell B.

The handover process may be referred to as an automatic neighbor relation (ANR) process and may occur when a source cell does not have, e.g., stored in an NRT, the PCI or the ECGI of the target cell. In this instance, the source cell may instruct the UE to report the ECGI of the target cell such that a neighbor relation may be established between the source cell and the target cell.

However, if the UE 102 is not an LTE-only UE, e.g., the UE either only operates on a 5G network or is a dual connectivity UE 102, such UE may experience problems when moving between cells that do not have a neighbor relation because such UE may be incapable of ECGI decoding or reporting and thus incapable of facilitating the creation of a neighbor relation between two adjacent cells that lack a neighbor relation. For example, NSA UEs, when operating in an EN-DC operability mode, may lack ECGI decoding or reporting or may be otherwise unable to obtain the ECGI of a proximate cell. In addition or in the alternative, while a UE is operating in an NSA/EN-DC mode, the UE 102 may not support LTE Automatic Neighbor Relation (ANR) discovery, which may prevent the UE 102 from decoding or reporting an ECGI.

Figure 2:
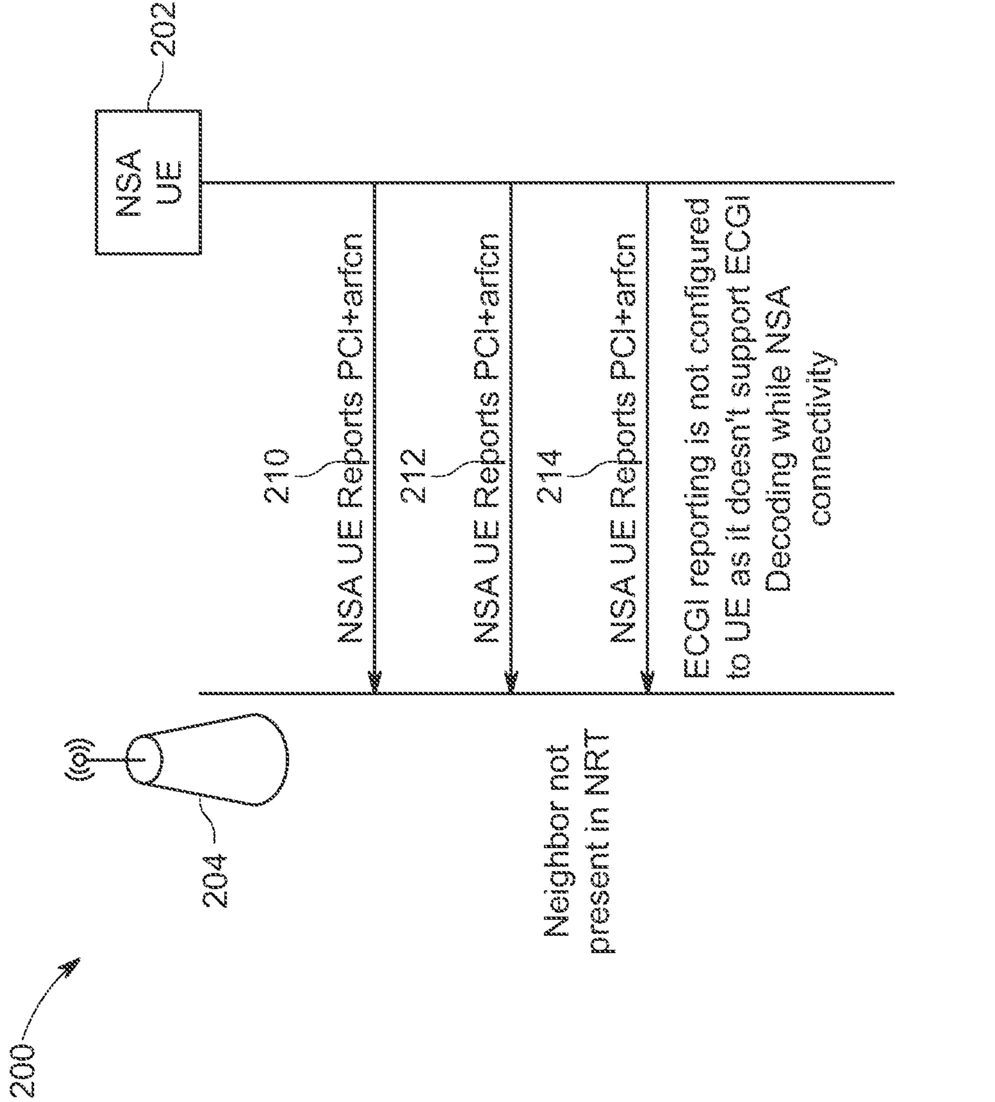
FIG. 2 is a diagram depicting the flow of information between a Non-standalone (NSA) User Equipment (UE) device and a base station, in accordance with a related art system.

FIG. 2 is a diagram depicting related-art communications in a related-art system 200. The system 200 includes an NSA UE 202 and a cell 204. The cell 204 may be a source cell 204, and the NSA UE 202 may be moving toward a target cell (not shown) as the NSA UE 202 sequentially transmits communications 210, 212, and 214 to the source cell 202. Communications 210, 212, and 214 consist of the NSA UE 202 repeatedly reporting the PCI, ARFCN, and measurements of the target cell to the source cell 204. The NSA UE 202 may not be configured to report ECGI because the NSA UE 202 may not support either or both of ECGI decoding or ECGI reporting while the NSA UE 202 is in NSA-connectivity mode. As a consequence, the gradual increase in distance between the NSA UE 202 and the source cell 204 causes a degradation in performance; the NSA UE cannot initiate a handoff between the source cell 204 and the target cell; and ultimately, after a distance between the NSA UE 202 and the source cell 204 becomes large enough (e.g., equal to or greater than some threshold distance) the connection between the NSA UE 202 and the source cell 204 may be "dropped" or "lost," i.e., the connection may fail and the NSA UE 202 may be disconnected from its mobile network. As a consequence, if a user (not shown) is using the NSA UE 202 for a telephone call or for other purposes, the user's the telephone call or network session may be interrupted (due to the degraded or failed connection) thereby inconveniencing the user and damaging the reputation of the mobile service provider, especially if such problems occur repeatedly. These problems occur not only with an NSA UE 202 that operates only using 5G but also occur with an NSA UE 202 that operates in dual connectivity mode.

Figure 3:
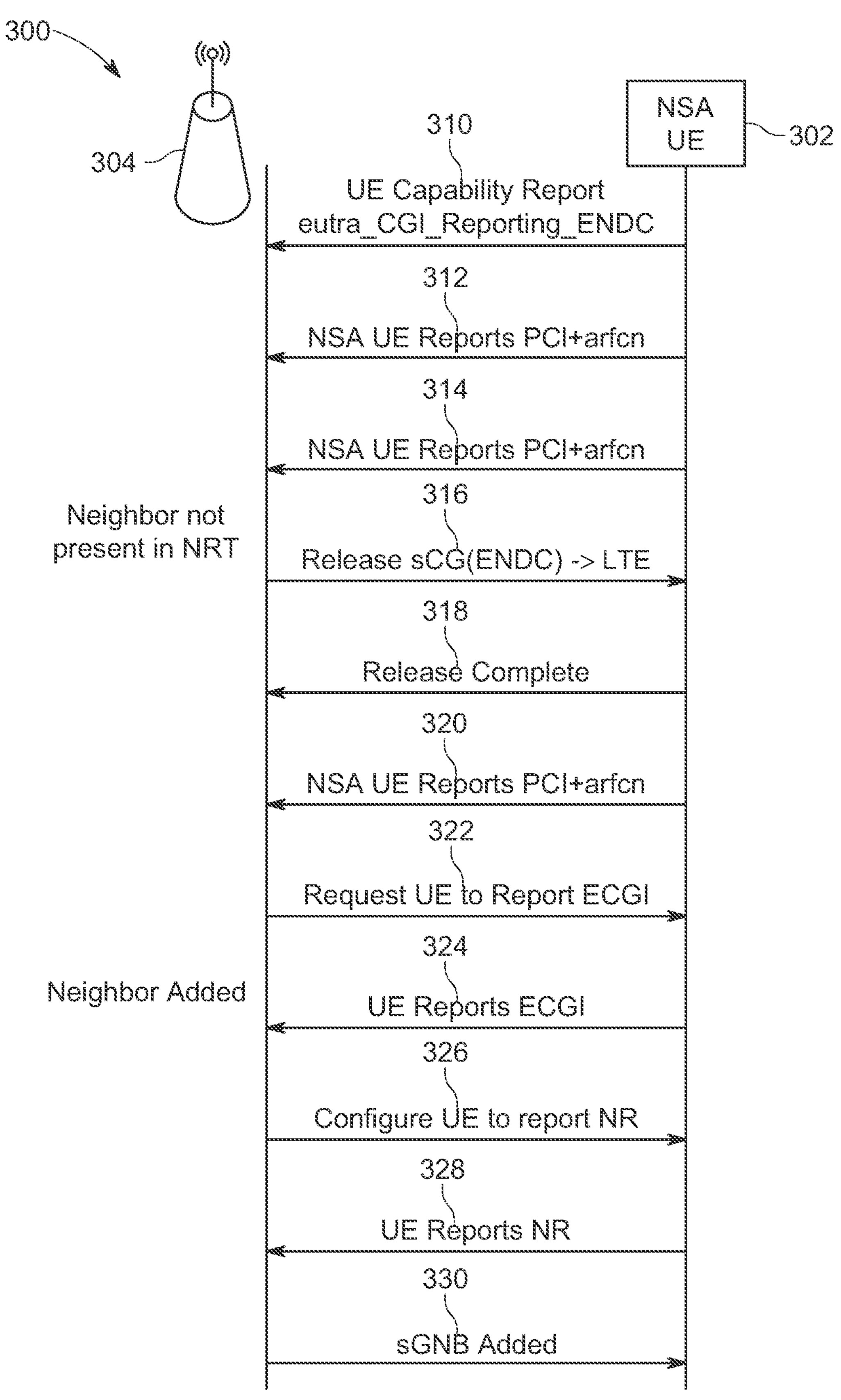
FIG. 3 is a diagram depicting the flow of information between an NSA UE device and a base station, in accordance with one or more example embodiments.

The techniques described herein solve the above-noted problems and provide for more reliable connections of dual connectivity UEs, even when the dual connectivity UEs move between adjacent cells that lack neighbor relations. Specifically, systems, apparatuses, methods, and computer programs, in accordance with one or more example embodiments, allow a dual connectivity UE to establish a neighbor relation between adjacent cells that lack a neighbor relation FIG. 3 is a diagram depicting communications 310 through 330 in a system 300, in accordance with one or more example embodiments of the present disclosure. The system 300 includes an NSA UE 302 and a cell 304, which may be a source cell 304. In step 310, the NSA UE 302 transmits a UE capability report, which may be described by the parameter "eutra_CGI_Reporting_ENDC." The UE capability report may include information that indicates capabilities of the UE such as, e.g., whether the UE is an LTE-only UE, a 5G-only UE, or a dual connectivity UE. In some embodiments, the UE capability report may indicate whether the UE does not support ECGI decoding or reporting while operating in an NSA mode. Additionally or alternatively, the UE capability report may contain additional or alternative information regarding capabilities of the UE. In the embodiment shown in FIG. 3, the UE is a NSA UE 302 may be a dual connectivity UE. The NSA UE 302 begins operating in an EN-DC mode in which the NSA UE 302 simultaneously uses a first communication protocol, e.g., LTE, and a second communication protocol, e.g., 5G.

In communication 312 and communication 314, the NSA UE 302 may report the PCI, ARFCN, and measurements of a target cell (not shown) to the source cell 304. The NSA UE 302 may report multiple instances of the PCI, ARFCN, and measurements of the target cell to the source cell 304 for a number of reasons.

For example, in some embodiments, the source cell 304 may analyze multiple measurements (e.g., signal strength or quality) of communications between the NSA UE 304 and the target cell to determine whether the NSA UE 302 is approaching the target cell. In some embodiments, the NSA UE 302 determines the NSA UE 302 is approaching the target cell by determining a measurement received in communication 314 is stronger or of higher quality than a measurement received in communication 312. In an alternate embodiment, only one of communication 312 and communication 314 is transmitted, and the other is not transmitted. While not shown, the NSA UE 302 may also obtain measurements of communications between the NSA UE 302 and the source cell 304, and additionally, the NSA UE 302 may compare one or more source cell 304 measurements with one or more target cell measurements to determine whether a handoff may be advantageous.

Additionally, there may be an embodiment in which the communication 310, which includes the UE capability report, is not included in FIG. 3. In this embodiment, the source cell 304 may determine that the NSA UE 302 does not support ECGI decoding or reporting and thus is incapable of establishing a neighbor relation when the source device 304 receives two or more instances of the NSA UE 302 transmitting the PCI, ARFCN, and/or measurements of the same target cell, e.g., as in when receiving communications 312 and 314. Multiple instances the PCI, ARFCN, and/or measurements of the target cell being received may be referred to as the UE being "camped" or "stuck" on 5G/NSA functionality. In this instance, the source device 304 may determine it does not have a neighbor relation with the target cell and initiate communication 316, which is further described below.

In some embodiments, upon receiving the PCI of a target cell, the source cell 304 may check whether the PCI of the target cell is present in an NRT. If the source cell 304 determines the PCI of the target cell is not the NRT, the source cell 304 may determine it does not have a neighbor relation with the target cell. In such instance, the source cell 304 may send a communication 316 that instructs the NSA UE 302 to exit dual connectivity mode such that the NSA UE 302 is changed from dual connectivity mode to an LTE-only mode. For example, the communication 316 may include an instruction to release a secondary cell group sCG of an EN-DC configuration, e.g., to prohibit or "release" 5G functionality. In some embodiments, an eNB initiates a release for the NSA UE 302. This same release process may occur for a 5G-only NSA UE 302.

Upon receiving communication 316, the NSA UE 302 may exit dual connectivity mode (or 5G-only mode) such that the NSA UE 302 enters an LTE-only mode. For example, the NSA UE 302 may release the secondary cell group sCG of its EN-DC configuration. In some embodiments, an LTE component of the NSA UE 302 is associated with a first PCI and an NR component of the NSA UE 302 is associated with a second PCI; upon receiving communication 316, the LTE component of the NSA UE 302 remains associated with the first PCI but the NR component of the NSA UE 302 will no longer be associated with the second PCI as the NR component will be "released," i.e., the NR component will no longer be connected.

Thereafter, the NSA UE 302 may send communication 318, which includes information indicating the NSA UE 302 has either exited dual connectivity mode, has entered LTE-only mode, or has completed a release of the secondary cell group sCG. When the NSA UE 302 has either exited dual connectivity mode, has entered LTE-only mode, or has completed a release of the secondary cell group sCG, the NSA UE 302 may send the PCI, ARFCN, and measurements of the target cell to the source cell 304 in communication 320.

Next, the source cell 304 may transmit communication 322, which includes a request for the UE to report the ECGI of the target cell. Upon receiving communication 322, the NSA UE 302, which is in an LTE-only mode, may receive an SIB from the target cell (eNB). Since the NSA UE 302 is operating in LTE-only mode, the NSA UE 302 may be capable of ECGI decoding or reporting, and the NSA UE 302 may decode the SIB of the target cell, thereby obtaining the ECGI of the target cell.

In communication 324, the NSA UE 302 may transmit or report the ECGI of the target cell to the source cell 304. The source cell 304 may then add the PCI and ECGI of the target cell to its NRT thereby establishing a neighbor relation between itself and the target cell. At this point, the eNB may add the NSA UE 302 again and continue EN-DC services. In communication 326, the source cell 304 instructs the NSA UE 302 to transmit or report one or more pieces of information relating to a 5G (or NR) network or configuration. In some embodiments, the communication 326 facilitates a configuration of the NSA UE 302 to return to a dual functionality mode, e.g., a mode that uses EN-DC. In response, in a communication 328 the NSA UE 302 transmits or reports the NR information or configuration to the source cell 304. In some embodiments, communication 328 indicates the NSA UE 302 has successfully returned to the dual functionality mode, e.g., the mode that uses EN-DC. Lastly, a secondary gNB (or SgNB) is added, and a communication 330 related to the adding of the SgNB is transmitted from the source cell 304 to the NSA UE 302. In this last step of the process, the EN-DC may be re-established with gNB, and the eNB may be configured with EN-DC.

In other words, a UE may exit EN-DC functionality such that the UE functions only on the LTE network. When the UE is only functioning on the LTE network, the UE can report the ECGI to add a neighbor. After adding the neighbor, the UE may resume normal operation using EN-DC. As a result of communications 326 through 330, the system 300 causes the NSA UE 302 to re-enter dual connectivity mode after a neighbor relation between the source cell 304 and the target cell has been established. Accordingly, the system 300 enables an NSA UE 302 to function in dual connectivity mode (or 5G-only mode), thereby taking advantage of the increased processing speeds and data transfer rates associated with a dual connectivity mode (or a 5G-only) mode, which are relatively higher performance as compared to LTE-only mode, without sacrificing network connectivity, which occur when the related-art NSA UE 202 moves between adjacent cells that lack a neighbor relation.

In an alternate embodiment, during a time period after the source cell 304 sends communication 316 (i.e., the instruction to exit dual connectivity mode, enter LTE-only mode, or completed a release of the secondary cell group sCG), the NSA UE 302 may move out of proximity of the original target cell and in proximity to another cell (not shown), which may be referred to as an "alternate target cell." In some embodiments, instead of transmitting the PCI, ARFCN, and measurements of the original target cell to the source cell 304 in communication 320, the NSA UE 302 sends the PCI, ARFCN, and measurements of the alternate target cell to the source cell 304 in communication 320. Subsequently, communications 322 through 330 between the NSA UE 302 and the source cell 304 may continue, but instead of a neighbor relation being established between the source cell 304 and the original target cell, a neighbor relation may be established between the source cell 304 and the alternate target cell, that is, if the source cell 304 and the alternate target cell previously lacked a neighbor relation. If the source cell 304 and the alternate target cell had a neighbor relation, a neighbor relation between the source cell and the alternate target cell may not need to be established. If the source cell 304 and the alternate target cell had a neighbor relation, the system may proceed with a handoff between the source cell and the alternate target cell. Nevertheless, in some embodiments, a neighbor relation may be established and/or a handoff may occur between the NSA UE 302 and another cell besides the original target cell, e.g., the alternate target cell.

While the NSA UE 302 is described as a dual connectivity UE, in another embodiment, the NSA UE 302 may be a UE that otherwise only operates in a 5G-only mode, but is caused to operate in an LTE-only mode when the primarily 5G-only UE moves from a source cell to a target cell lacking a neighbor relation with the source cell. In this instance, the communications 310 through 330 may be similar except that instead of (A) exiting dual connectivity mode, entering LTE-only mode, establishing a neighbor connection while only in LTE-only mode, and re-establishing dual connectivity mode, the process includes (B) exiting 5G-only mode, entering LTE-only mode, establishing a neighbor connection while only in LTE-only mode, and re-establishing 5G-only mode Another advantage of establishing a neighbor relation between the source cell 304 and the target cell relates to future instances when a NSA UE 302 travels from the source cell 304 to the target cell or vice versa. After a neighbor relation is established between the source cell 304 and the target cell, e.g., using the process depicted in FIG. 3, the process depicted in FIG. 3 may not need to be repeated, at least for the specific source cell 304 and the specific target cell that thereinafter have a neighbor relation. In other words, neighbor relations created using the process depicted in FIG. 3 may persist over time, and after two adjacent cells have established a neighbor relation, any UE moving from one to the other may take advantage of their neighbor relation to seamless perform a handoff without having to exit dual connectivity mode (or 5G-only mode).

Figure 4:
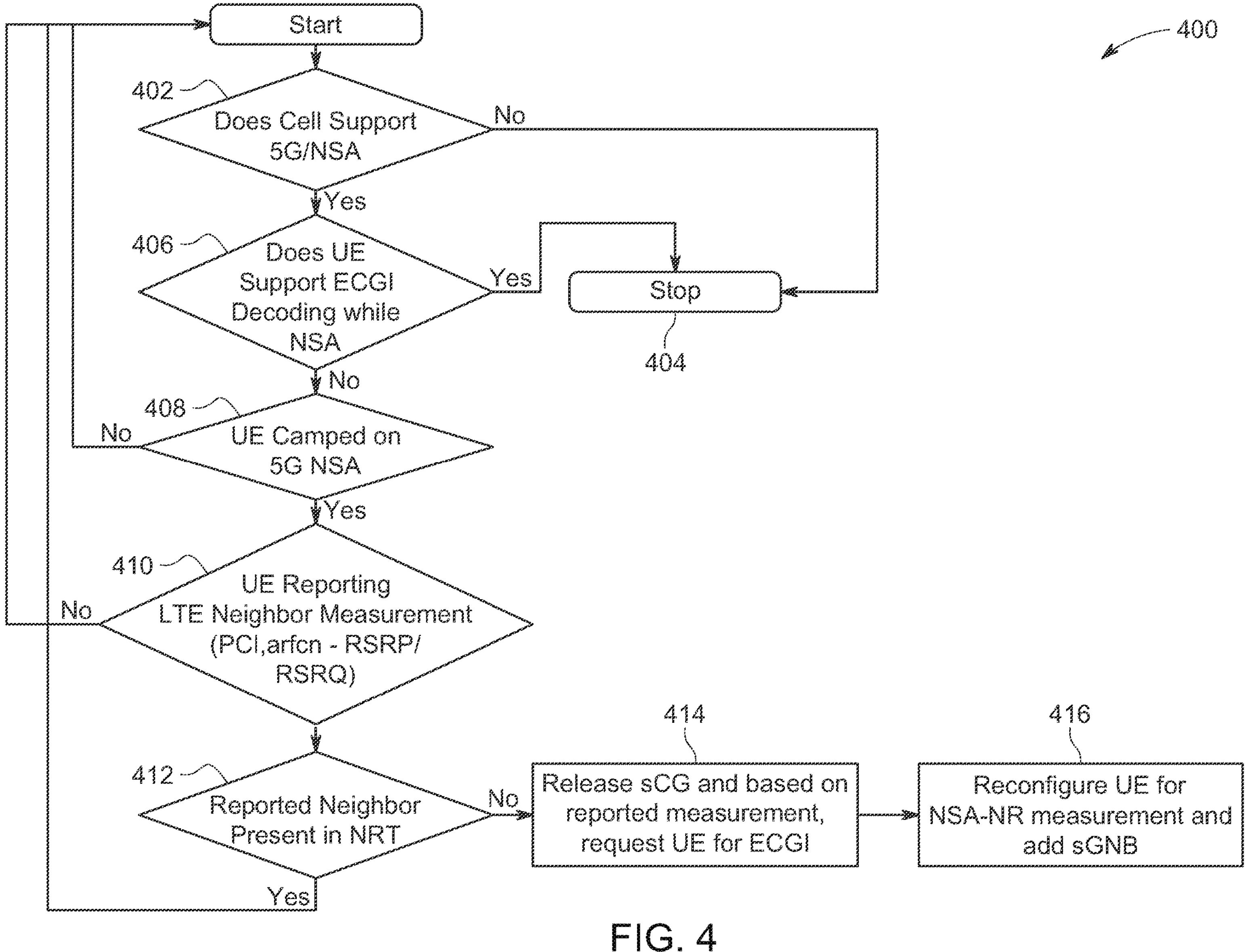
FIG. 4 illustrates a process flow diagram of an enhanced automatic neighbor relation process, in accordance with one or more example embodiments.

FIG. 4 illustrates a process flow diagram of an enhanced automatic neighbor relation process 400, in accordance with one or more example embodiments. In some embodiments, FIG. 4 shows an LTE ANR enhancement for NSA UEs, and a neighbor relation may be established for a dual connectivity UE.

The first operation of process 400 is operation 402, which makes a determination of whether a cell supports either 5G or NSA functionality. If the cell does not support 5G or NSA functionality, the process ends at operation 404. If the cell does support 5G or NSA functionality, the process proceeds to operation 406, which makes a determination as to whether the UE supports ECGI decoding or reporting while operating in an NSA mode. If the UE supports ECGI decoding or reporting while operating in an NSA mode, the process ends at operation 404. However, if the UE does not support ECGI decoding or reporting while operating in an NSA mode, the process proceeds to operation 408. At operation 408, a determination is made as to whether the UE is “camped” or stuck on 5G/NSA functionality. This determination may be made when a predetermined number of instances of a UE reporting a PCI and an ARFCN of a target cell are received. As previously noted, receiving two or more instances of a UE reporting a PCI and an ARFCN of the same target cell (e.g., receiving a threshold amount of instances) may be an indication that the target cell and the source cell do not have a neighbor relation.

If a determination is made that the UE is not camped on 5G/NSA functionality, the process may loop back to operation 402. If a determination is made that the UE is camped on 5G/NSA functionality, then the process proceeds to operation 410, where a determination is made as to whether the UE is reporting measurements of a neighbor cell that may operate using LTE. If a determination is made that the UE is not reporting measurements of a neighbor cell that may operate using LTE, the process may loop back to operation 402. If a determination is made that the UE is reporting measurements of a neighbor cell that may operate using LTE, the process proceeds to operation 412, where a determination is made as to whether a reported neighbor is present in the NRT. If a determination is made that a reported neighbor is present in the NRT, the process loops back to operation 402. In some embodiments, instead of looping back to operation 402, when a reported neighbor is present in the NRT, the a handoff is completed with the neighbor cell present in the NRT.

If a determination is made that a reported neighbor is not present in the NRT, the process proceeds to operation 414, where sCG is released, and an ECGI is requested from the UE based on a reported measurement. The process proceeds from operation 414 to operation 416 in which the UE is reconfigured for NSA-NR measurements and a SgNB is added. Operation 416 may further include adding a neighbor to a neighbor relation table based on the ECGI that is obtained from the UE. In some embodiments, operation 416 includes eNB communicating with the UE and requesting the UE report to eNB with the 5G cell, with which the UE is about to communicate. In other words, step 416 may consist of reconfiguring the UE to send a measurement profile. Once the UE sends a measurement that includes characteristics of a cell under certain conditions, eNB may add that 5G cell at EN-DC. Once a 5G cell is reported, eNB may be configured with EN-DC, i.e., the EN-DC may be re-established. As noted, EN-DC may be re-established with the same base station as before or another base station. In some embodiments, a handoff is not performed (e.g., a handoff to another eNB) and the UE may only re-establish EN-DC.

Figure 5:
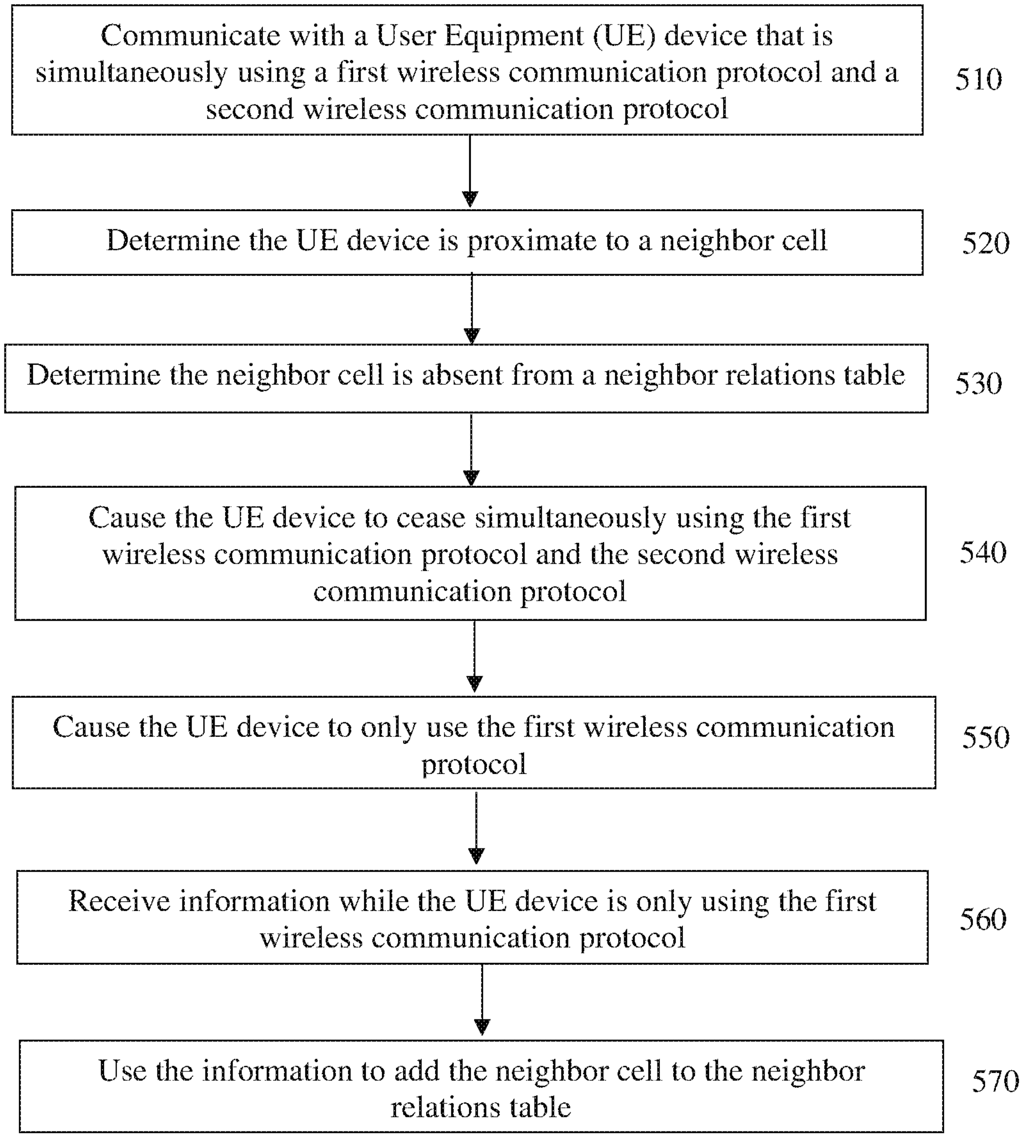
FIG. 5 illustrates a flowchart of an enhanced automatic neighbor relation method, in accordance with one or more example embodiments.

FIG. 5 illustrates a flowchart of a method 500 for adding a neighbor cell to a neighbor relations table, in accordance with one or more example embodiments. Referring to FIG. 5, at operation 510, a component of the system may communicate with a User Equipment (UE) device that is simultaneously using a first wireless communication protocol and a second wireless communication protocol. At operation 520, a component of the system may determine the UE device is proximate to the neighbor cell. At operation 530, a component of the system may determine the neighbor cell is absent from the neighbor relations table. At operation 540, a component of the system may cause the UE device to cease simultaneously using the first wireless communication protocol and the second wireless communication protocol. At operation 550, a component of the system may cause the UE device to only use the first wireless communication protocol. At operation 560, a component of the system may receive information while the UE device is only using the first wireless communication protocol. Finally, at operation 570, a component of the system may use the information to add the neighbor cell to the neighbor relations table.

The various actions, acts, blocks, steps, or the like in the flow diagram 500 may be performed in the order presented, in a different order, or simultaneously. Further, in some embodiments, some of the actions, acts, blocks, steps, or the like may be omitted, added, modified, skipped, or the like without departing from the scope of the invention.

Figure 6:
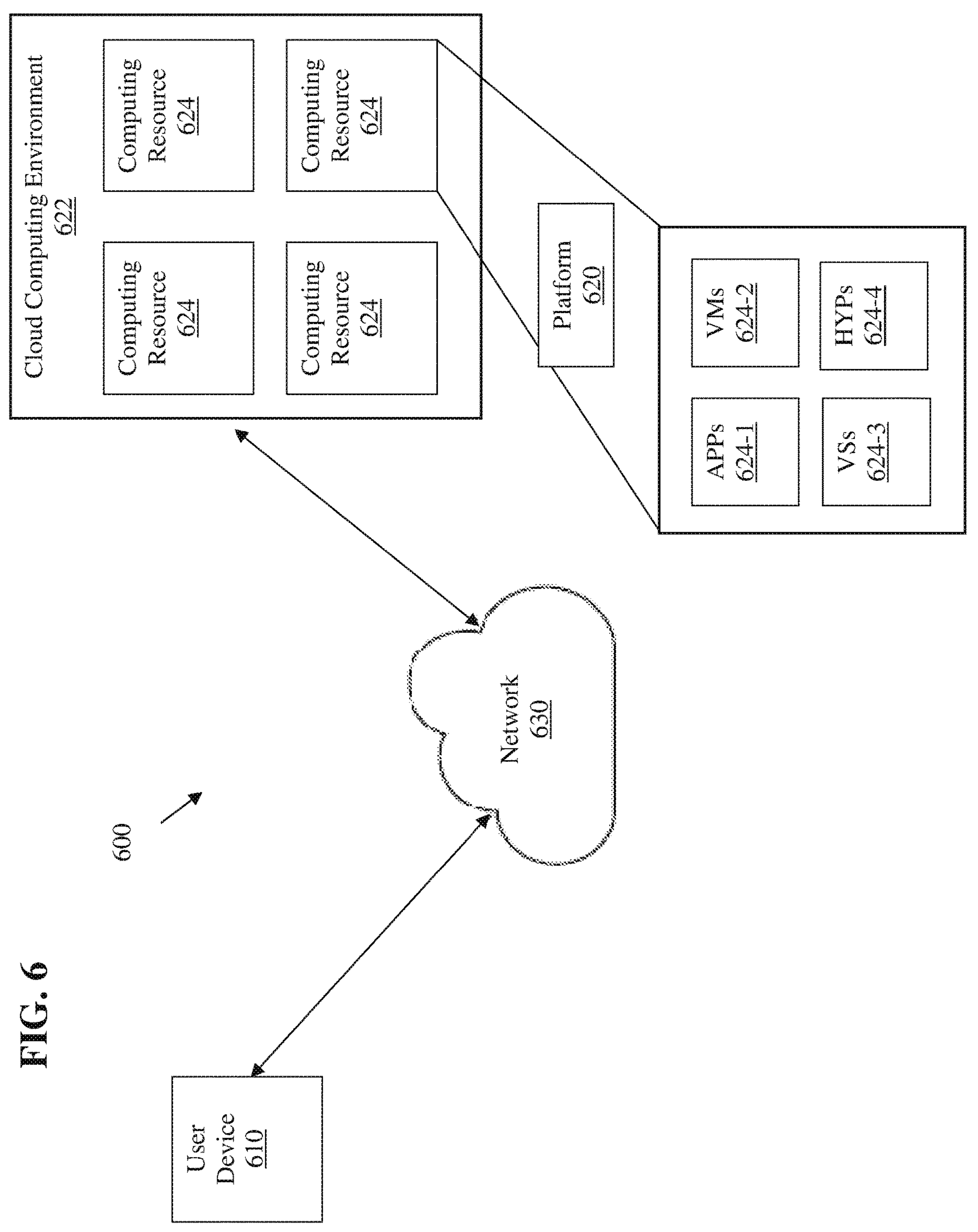
FIG. 6 is a diagram of an example environment in which systems and/or methods, described herein, may be implemented.

FIG. 6 is a diagram of an example environment 600 in which systems and/or methods, described herein, may be implemented. As shown in FIG. 6, environment 600 may include a user device 610, a platform 620, and a network 630. Devices of environment 600 may interconnect via wired connections, wireless connections, or a combination of wired and wireless connections. In embodiments, any of the functions and operations described with reference to FIGS. 1 and 3 through 5 above may be performed by any combination of elements illustrated in FIG. 6.

User device 610 includes one or more devices capable of receiving, generating, storing, processing, and/or providing information associated with platform 620. For example, user device 610 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 610 may receive information from and/or transmit information to platform 620.

Platform 620 includes one or more devices capable of receiving, generating, storing, processing, and/or providing information. In some implementations, platform 620 may include a cloud server or a group of cloud servers. In some implementations, platform 620 may be designed to be modular such that certain software components may be swapped in or out depending on a particular need. As such, platform 620 may be easily and/or quickly reconfigured for different uses.

In some implementations, as shown, platform 620 may be hosted in cloud computing environment 622. Notably, while implementations described herein describe platform 620 as being hosted in cloud computing environment 622, in some implementations, platform 620 may not be cloud-based (i.e., may be implemented outside of a cloud computing environment) or may be partially cloud-based.

Cloud computing environment 622 includes an environment that hosts platform 620. Cloud computing environment 622 may provide computation, software, data access, storage, etc., services that do not require end-user (e.g., user device 610) knowledge of a physical location and configuration of system(s) and/or device(s) that hosts platform 620. As shown, cloud computing environment 622 may include a group of computing resources 624 (referred to collectively as "computing resources 624" and individually as "computing resource 624").

Computing resource 624 includes one or more personal computers, a cluster of computing devices, workstation computers, server devices, or other types of computation and/or communication devices. In some implementations, computing resource 624 may host platform 620. The cloud resources may include compute instances executing in computing resource 624, storage devices provided in computing resource 624, data transfer devices provided by computing resource 624, etc. In some implementations, computing resource 624 may communicate with other computing resources 624 via wired connections, wireless connections, or a combination of wired and wireless connections.

As further shown in FIG. 6, computing resource 624 includes a group of cloud resources, such as one or more applications ("APPs") 624-1, one or more virtual machines ("VMs") 624-2, virtualized storage ("VSs") 624-3, one or more hypervisors ("HYPs") 624-4, or the like.

Application 624-1 includes one or more software applications that may be provided to or accessed by user device 610. Application 624-1 may eliminate a need to install and execute the software applications on user device 610. For example, application 624-1 may include software associated with platform 620 and/or any other software capable of being provided via cloud computing environment 622. In some implementations, one application 624-1 may send/receive information to/from one or more other applications 624-1, via virtual machine 624-2.

Virtual machine 624-2 includes a software implementation of a machine (e.g., a computer) that executes programs like a physical machine. Virtual machine 624-2 may be either a system virtual machine or a process virtual machine, depending upon use and degree of correspondence to any real machine by virtual machine 624-2. A system virtual machine may provide a complete system platform that supports execution of a complete operating system ("OS"). A process virtual machine may execute a single program, and may support a single process. In some implementations, virtual machine 624-2 may execute on behalf of a user (e.g., user device 610), and may manage infrastructure of cloud computing environment 622, such as data management, synchronization, or long-duration data transfers.

Virtualized storage 624-3 includes one or more storage systems and/or one or more devices that use virtualization techniques within the storage systems or devices of computing resource 624. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 624-4 may provide hardware virtualization techniques that allow multiple operating systems (e.g., "guest operating systems") to execute concurrently on a host computer, such as computing resource 624. Hypervisor 624-4 may present a virtual operating platform to the guest operating systems, and may manage the execution of the guest operating systems. Multiple instances of a variety of operating systems may share virtualized hardware resources.

Network 630 includes one or more wired and/or wireless networks. For example, network 630 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 6 are provided as an example. In practice, there may be additional devices and/or networks, fewer devices and/or networks, different devices and/or networks, or differently arranged devices and/or networks than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) of environment 600 may perform one or more functions described as being performed by another set of devices of environment 600.

Figure 7:
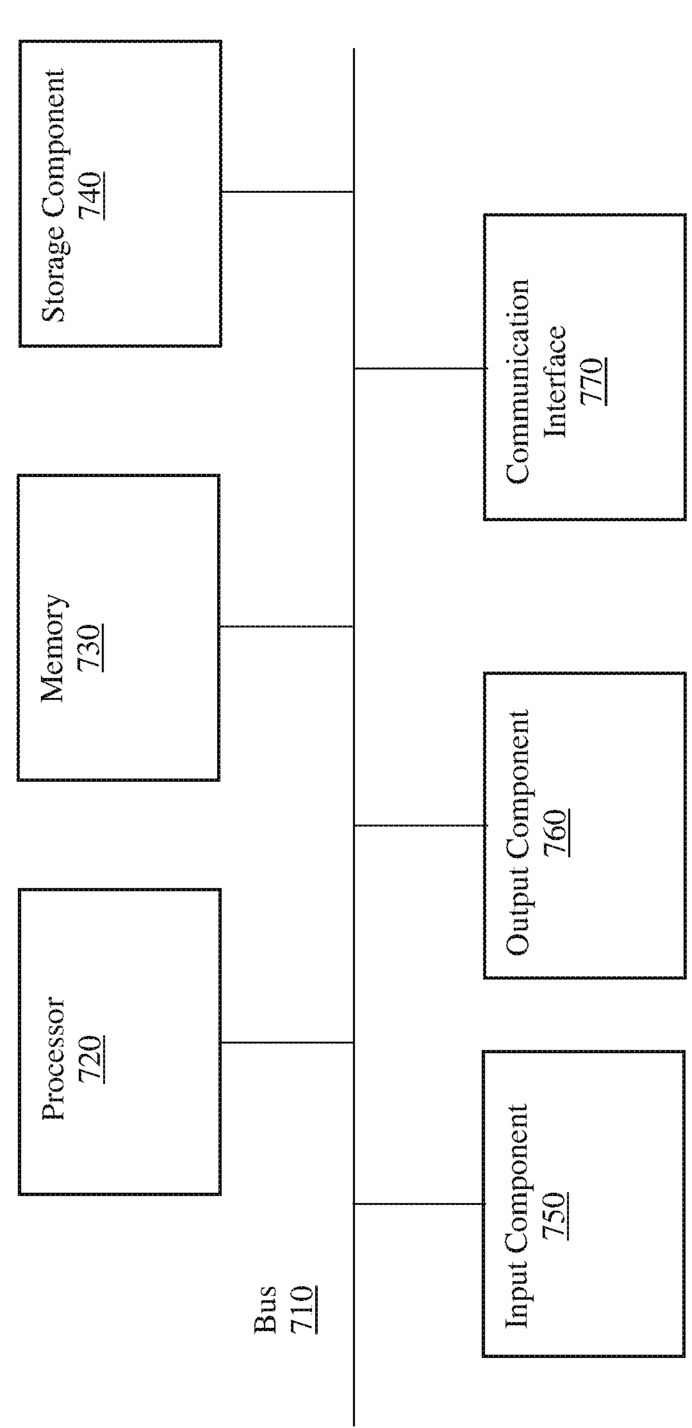
FIG. 7 illustrates a diagram of components of one or more devices, in accordance with one or more example embodiments.

FIG. 7 is a diagram of example components of a device 700. Device 700 may correspond to user device 610 and/or platform 620. As shown in FIG. 7, device 700 may include a bus 710, a processor 720, a memory 730, a storage component 740, an input component 750, an output component 760, and a communication interface 770.

Bus 710 includes a component that permits communication among the components of device 700. Processor 720 may be implemented in hardware, firmware, or a combination of hardware and software. Processor 720 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 720 includes one or more processors capable of being programmed to perform a function. Memory 730 includes a random access memory (RAM), a read only memory (ROM), and/or another type of dynamic or static storage device (e.g., a flash memory, a magnetic memory, and/or an optical memory) that stores information and/or instructions for use by processor 720.

Storage component 740 stores information and/or software related to the operation and use of device 700. For example, storage component 740 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 750 includes a component that permits device 700 to receive information, such as via user input (e.g., a touch screen display, a keyboard, a keypad, a mouse, a button, a switch, and/or a microphone). Additionally, or alternatively, input component 750 may include a sensor for sensing information (e.g., a global positioning system (GPS) component, an accelerometer, a gyroscope, and/or an actuator). Output component 760 includes a component that provides output information from device 700 (e.g., a display, a speaker, and/or one or more light-emitting diodes (LEDs)).

Communication interface 770 includes a transceiver-like component (e.g., a transceiver and/or a separate receiver and transmitter) that enables device 700 to communicate with other devices, such as via a wired connection, a wireless connection, or a combination of wired and wireless connections. Communication interface 770 may permit device 700 to receive information from another device and/or provide information to another device. For example, communication interface 770 may include an Ethernet interface, an optical interface, a coaxial interface, an infrared interface, a radio frequency (RF) interface, a universal serial bus (USB) interface, a Wi-Fi interface, a cellular network interface, or the like.

Device 700 may perform one or more processes described herein. Device 700 may perform these processes in response to processor 720 executing software instructions stored by a non-transitory computer-readable medium, such as memory 730 and/or storage component 740. A computer-readable medium is defined herein as a non-transitory memory device. A memory device includes memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 7 are provided as an example. In practice, device 700 may include additional components, fewer components, different components, or differently arranged components than those shown in FIG. 7. Additionally, or alternatively, a set of components (e.g., one or more components) of device 700 may perform one or more functions described as being performed by another set of components of device 700.

In embodiments, any one of the operations or processes of FIGS. 1 and 3 through 5 may be implemented by or using any one of the elements illustrated in FIGS. 6 and 7.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet service provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method, comprising:

communicating with a User Equipment (UE) device that is simultaneously using a first wireless communication protocol and a second wireless communication protocol;

determining the UE device is proximate to a neighbor cell;

determining the neighbor cell is absent from a neighbor relations table;

based at least on determining the neighbor cell is absent from the neighbor relations table, causing the UE device to cease simultaneously using the first wireless communication protocol and the second wireless communication protocol so as to use the first wireless communication protocol and not the second wireless communication protocol;

receiving information while the UE device is using the first wireless communication protocol and not the second wireless communication protocol; and using the information to add the neighbor cell to the neighbor relations table.

2. The method of claim 1, further comprising, based at least on the neighbor cell being added to the neighbor relations table, causing the UE device to simultaneously use the first wireless communication protocol and the second wireless communication protocol after the neighbor cell is added to the neighbor relations table.

3. The method of claim 1, further comprising determining the UE device is incapable of decoding or reporting a network-entity-related identifier.

4. The method of claim 3, wherein determining the UE device is incapable of decoding or reporting the network-entity-related identifier comprises determining the UE device is incapable of decoding or reporting an E-UTRAN Cell Global Identifier (ECGI).

5. The method of claim 3, wherein determining the UE device is incapable of decoding or reporting the network-entity-related identifier comprises determining the UE device has transmitted a plurality of communications including a same Physical Cell Identifier (PCI) of the neighbor cell.

6. The method of claim 1, wherein communicating with the UE device that is simultaneously using the first wireless communication protocol and the second wireless communication protocol comprises communicating using Eutra New Radio Dual Connectivity (ENDC).

7. The method of claim 1, wherein the determining the neighbor cell is absent from a neighbor relations table comprises:
- receiving a Physical Cell Identifier (PCI) of the neighbor cell; and
- determining the PCI of the neighbor cell is absent from a database storing PCIs associated with neighbor cells previously added to the neighbor relations table.

8. The method of claim 1, wherein causing the UE device to cease simultaneously using the first wireless communication protocol and the second wireless communication protocol comprises causing the UE device to only use an LTE communication protocol.

9. A method, comprising:
- communicating with a User Equipment (UE) device that is using a first wireless communication protocol;
- determining the UE device is proximate to a neighbor cell;
- determining the neighbor cell is absent from a neighbor relations table;
- based at least on determining the neighbor cell is absent from the neighbor relations table, causing the UE device to stop using the first wireless communication protocol, by releasing a connection with a cell using the first wireless communication protocol, and start using a second wireless communication protocol;
- receiving information while the UE device is using the second wireless communication protocol and not the first wireless communication protocol; and
- using the information to add the neighbor cell to the neighbor relations table.

10. The method of claim 9, further comprising, based at least on the neighbor cell being added to the neighbor relations table, causing the UE device to stop using the second communication protocol and begin using the first wireless communication protocol after the neighbor cell is added to the neighbor relations table.

11. The method of claim 9, further comprising determining the UE device is incapable of decoding or reporting a network-entity-related identifier.

12. The method of claim 11, wherein determining the UE device is incapable of decoding or reporting the network-entity-related identifier comprises determining the UE device is incapable of decoding or reporting an E-UTRAN Cell Global Identifier (ECGI).

13. The method of claim 11, wherein determining the UE device is incapable of decoding or reporting the network-entity-related identifier comprises determining the UE device has transmitted a plurality of communications including a same Physical Cell Identifier (PCI) of the neighbor cell.

14. The method of claim 9, wherein communicating with the UE device that is using the first wireless communication protocol comprises communicating with a 5G UE device.

15. The method of claim 9, wherein determining the neighbor cell is absent from a neighbor relations table comprises:
- receiving a Physical Cell Identifier (PCI) of the neighbor cell;
- determining the PCI of the neighbor cell is absent from a database storing PCIs associated with neighbor cells previously added to the neighbor relations table.

16. The method of claim 9, wherein the second wireless communication protocol is an LTE communication protocol.

17. A non-transitory computer-readable medium for storing computer readable program code or instructions for carrying out operations, when executed by a processor, for adding a neighbor cell to a neighbor relations table, the operations comprising:
- communicating with a User Equipment (UE) device that is simultaneously using a first wireless communication protocol and a second wireless communication protocol;
- determining the UE device is proximate to a neighbor cell;
- determining the neighbor cell is absent from a neighbor relations table;
- based at least on determining the neighbor cell is absent from the neighbor relations table, causing the UE device to cease simultaneously using the first wireless communication protocol and the second wireless communication protocol so as to use the first wireless communication protocol and not the second wireless communication protocol;
  - receiving information while the UE device is using the first wireless communication protocol and not the second wireless communication protocol; and
- using the information to add the neighbor cell to the neighbor relations table.

18. The non-transitory computer-readable medium of claim 17, wherein the operations further comprise, based at least on the neighbor cell being added to the neighbor relations table, causing the UE device to simultaneously use the first wireless communication protocol and the second wireless communication protocol after the neighbor cell is added to the neighbor relations table.

19. The non-transitory computer-readable medium of claim 17, wherein the operations further comprise determining the UE device is incapable of decoding or reporting a network-entity-related identifier.

20. The non-transitory computer-readable medium of claim 19, wherein the operation of determining the UE device is incapable of decoding or reporting the network-entity-related identifier comprises determining the UE device is incapable of decoding or reporting an E-UTRAN Cell Global Identifier (ECGI).

* * * * *